US008568126B2

(12) United States Patent
Piller

(10) Patent No.: US 8,568,126 B2
(45) Date of Patent: Oct. 29, 2013

(54) DEVICE FOR LOOPING RAW DOUGH PRODUCTS

(76) Inventor: Oswald Piller, Karlsfeld (DE)

( * ) Notice: Subject to any disclaimer, the term of this patent is extended or adjusted under 35 U.S.C. 154(b) by 0 days.

(21) Appl. No.: 13/472,835

(22) Filed: May 16, 2012

(65) Prior Publication Data

US 2012/0294965 A1 Nov. 22, 2012

(30) Foreign Application Priority Data

May 16, 2011 (DE) .......................... 10 2011 050 375

(51) Int. Cl.
*A21C 11/00* (2006.01)

(52) U.S. Cl.
USPC ............ 425/323; 425/143; 425/145; 425/150; 425/334; 425/391; 426/499; 426/500; 426/512

(58) Field of Classification Search
CPC ........................................................ A21C 3/08
USPC ......... 425/143, 145, 320, 323, 334, 391, 150; 426/499, 500, 512, 517
See application file for complete search history.

(56) References Cited

U.S. PATENT DOCUMENTS

| 4,803,086 | A | * | 2/1989 | Hedenberg | 426/87 |
| 5,415,081 | A | * | 5/1995 | Yoshida et al. | 99/326 |
| 5,492,708 | A | * | 2/1996 | Hemmerich | 426/499 |
| 5,494,428 | A | * | 2/1996 | Piller | 425/145 |
| 5,523,106 | A | * | 6/1996 | Gimmler et al. | 426/549 |
| 5,580,599 | A | * | 12/1996 | Fehr | 426/499 |
| 5,702,732 | A | * | 12/1997 | Piller | 425/145 |
| 5,766,663 | A | * | 6/1998 | Neumann et al. | 426/499 |
| 8,173,191 | B2 | * | 5/2012 | Bernhardt | 426/499 |
| 2001/0032546 | A1 | * | 10/2001 | Sharpe | 99/331 |
| 2004/0241267 | A1 | * | 12/2004 | Schultz | 425/193 |
| 2005/0244560 | A1 | * | 11/2005 | Schultz | 426/496 |
| 2006/0115566 | A1 | * | 6/2006 | Bloechlinger et al. | 426/549 |
| 2006/0240160 | A1 | * | 10/2006 | Peitzmeier et al. | 426/504 |
| 2008/0171120 | A1 | * | 7/2008 | Willett | 426/496 |
| 2008/0181992 | A1 | * | 7/2008 | Willett | 426/233 |
| 2010/0008396 | A1 | * | 1/2010 | Gaskins et al. | 374/141 |
| 2010/0159098 | A1 | * | 6/2010 | Bernhardt | 426/499 |
| 2010/0233340 | A1 | * | 9/2010 | Bernhardt | 426/499 |
| 2012/0138427 | A1 | * | 6/2012 | Piller | 198/579 |
| 2012/0294965 | A1 | * | 11/2012 | Piller | 425/150 |

FOREIGN PATENT DOCUMENTS

| DE | 19852046 | C1 | 5/2000 | |
| DE | 102006051300 | | * 5/2008 | .............. A21C 3/08 |
| DE | 102009006479 | A1 | 8/2010 | |
| DE | 102010008024 | A1 | 8/2011 | |
| EP | 1935246 | B1 | 12/2007 | |

* cited by examiner

*Primary Examiner* — Seyed Masoud Malekzadeh

(74) *Attorney, Agent, or Firm* — Karl F. Milde, Jr.; Eckert Seamans Cherin & Mellott, LLC

(57) ABSTRACT

Apparatus for looping raw dough products, in particular strands of dough preshaped to produce pretzels, comprises a device for supplying the raw dough products—e.g. a conveyor—and a loop-forming device for looping the raw dough products, in order to produce pretzel-shaped raw dough products. This device comprises sensors for detecting the ends of the raw dough products for the purpose of controlling gripping devices of the loop-forming device. The sensors for detecting the ends of the raw dough products are designed as thermal imaging sensors.

3 Claims, 2 Drawing Sheets

DEVICE FOR LOOPING RAW DOUGH PRODUCTS

BACKGROUND OF THE INVENTION

The present invention relates to a device for looping raw dough products, in particular strands of dough pre-shaped to produce pretzels.

Devices for looping pretzels is known from the prior art. They generally comprise apparatus for supplying raw dough products and a loop-forming device for looping the raw dough products in order to produce pretzel-shaped raw dough products. Optionally a device may be provided for stretching and/or aligning the raw dough products generally supplied to the loop-forming device in a U-shape with the branches (legs) of the U in front or forward as viewed in the direction of conveyor movement.

In devices known from the prior art for looping pretzels, sensors are provided which detect the ends of the strands of dough for the purpose of aligning and/or for the purpose of controlling gripping devices of the loop-forming device.

Such sensors are generally designed as single-path or reflex light barriers. For example, in DE 10 2009 0006 479 A1, a device is disclosed for looping raw dough products, in particular for producing pretzels, which comprises a loop-forming device and a conveying device for the raw dough products. At the end of the conveying device facing the loop-forming device in each case a component is provided which serves as a "dough receiver" for the arriving (leading) end of a raw dough product and includes, and/or is operatively connected to, a sensor for detecting the raw dough product.

Another device for producing pretzels is disclosed in DE 198 52 046 C1. This device comprises a supply arrangement, a discharge arrangement for the completed pretzel loops, a working platform and a robot arm or linear robot for looping the raw dough products. The robot arm or linear robot is provided on its underside with grippers or suction pads for looping the strand of dough to form a pretzel. In this case, the known device comprises at least one sensor for ascertaining the end of the strand of dough, and a control device that coordinates the cooperating movements of the movable individual parts of the device using the signals thereof.

Apparatus for stretching and/or aligning raw dough products is disclosed in DE 10 2010 008 024.1. This apparatus comprises a sensor unit having two sensors for detecting the ends of a strand of dough of the arriving raw dough products. In the case where the sensors for detecting the ends of a strand of dough in the conveying direction are arranged upstream of the means for aligning and/or stretching the raw dough products, the known device comprises a light barrier for detecting the raw dough product and. Thus. the moment in time when the transverse part of the U-shaped raw dough products, arriving with the branches of the U in front, passes through the light barrier.

EP 1 935 246 B1 discloses a system for measuring and aligning strands of dough in terms of their length and position for use in pretzel looping machines or other dough preparation machines. The system comprises a scanning device for individually identifying each of two end portions of a strand of dough protruding in the conveying direction, the scanning device for each end portion of a strand of dough in each case including a set, or group, or a row aligned therewith of a plurality of parallel energy sources and energy sensors or receivers. The energy sources and/or sensors or receivers thus grouped together are arranged and configured on both sides of the through-passage of the strand of dough in predetermined numbers and/or for emitting a predetermined quantity of energy. In this case, the control of the system in terms of circuitry and programming is designed and set up so that a quantity of energy, emitted by a group of energy sources towards the respective end portion of a strand of dough, may be compared with the amount of energy detected or received, and the length and/or position of the strand of dough may be derived from the comparison, and the drive unit of the system may be activated to maintain a predetermined position of the strand of dough.

The use of sensors known from the prior art which, as already explained, are designed as single-path or reflex light barriers or energy sources with associated energy receivers, results in increased costs and in complex assembly.

SUMMARY OF THE INVENTION

A principal object of the present invention, therefore, is to provide a device for looping raw dough products, in particular strands of dough preshaped to produce pretzels, in which the sensor system thereof is able to be produced cost-effectively and is able to be mounted in a simple manner. Moreover, the sensor system is also intended to serve as a monitoring system for the strength of the strand of dough.

This object, as well as other objects which will become apparent from the discussion that follows, are achieved, in accordance to the present invention, by providing apparatus for looping raw dough products, in particular strands of dough preshaped to produce pretzels, comprising a device for supplying the raw dough products and a loop-forming device for looping the raw dough products in order to produce pretzel-shaped raw dough products. The latter device comprises sensors for detecting the ends of the raw dough products for the purpose of controlling gripping devices of the loop-forming device. These sensors are designed as thermal imaging sensors for detecting the ends of the raw dough products.

The apparatus for looping raw dough products may additionally comprise a device for stretching and/or aligning the raw dough products supplied to the loop-forming device in a U-shape, with the branches of the U in front, and sensors for detecting the ends of the raw dough products for the purpose of aligning or stretching the raw dough products. Preferably, these sensors are also designed as thermal imaging sensors to detect the ends of the raw dough products for the purpose of aligning or stretching the raw dough products.

By means of these devices according to the invention the advantage is achieved that, in addition to reliably identifying and detecting the ends of the raw dough products, the temperature of the dough of the raw dough products may be determined so that measures for increasing or reducing this temperature may be introduced, depending on the detected temperature. This is particularly relevant because, when the temperature of the raw dough product exceeds a predetermined value, the tear strength of the dough, which is required for handling the dough, is disadvantageously reduced.

DETAILED DESCRIPTION OF THE PREFERRED EMBODIMENTS

Figure 1:
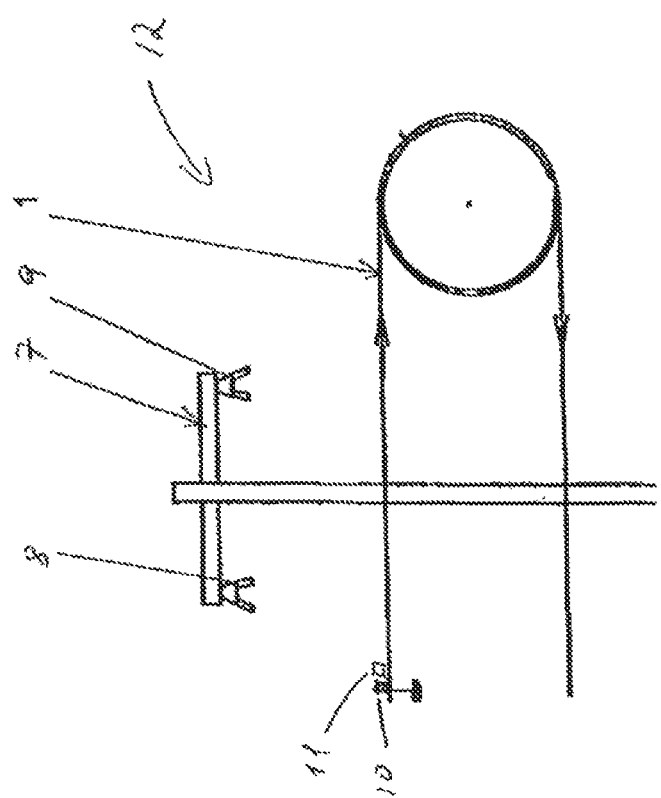
FIG. 1 is a representational diagram of a pretzel dough looping device according to a preferred embodiment of the present invention.

The preferred embodiments of the present invention will now be described with reference to FIGS. 1 and 2 of the drawings. Identical elements in the various figures are designated with the same reference numerals.

FIG. 1 generally shows a looping device 12 having two thermal imaging sensors 10, 11 on opposite sides of a conveyor belt 1 (the device for supplying the raw dough products). The gripping devices 8, 9 of the loop forming device 7 of this looping device 12 are controlled by signals from the thermal imaging sensors 10, 11.

Figure 2:
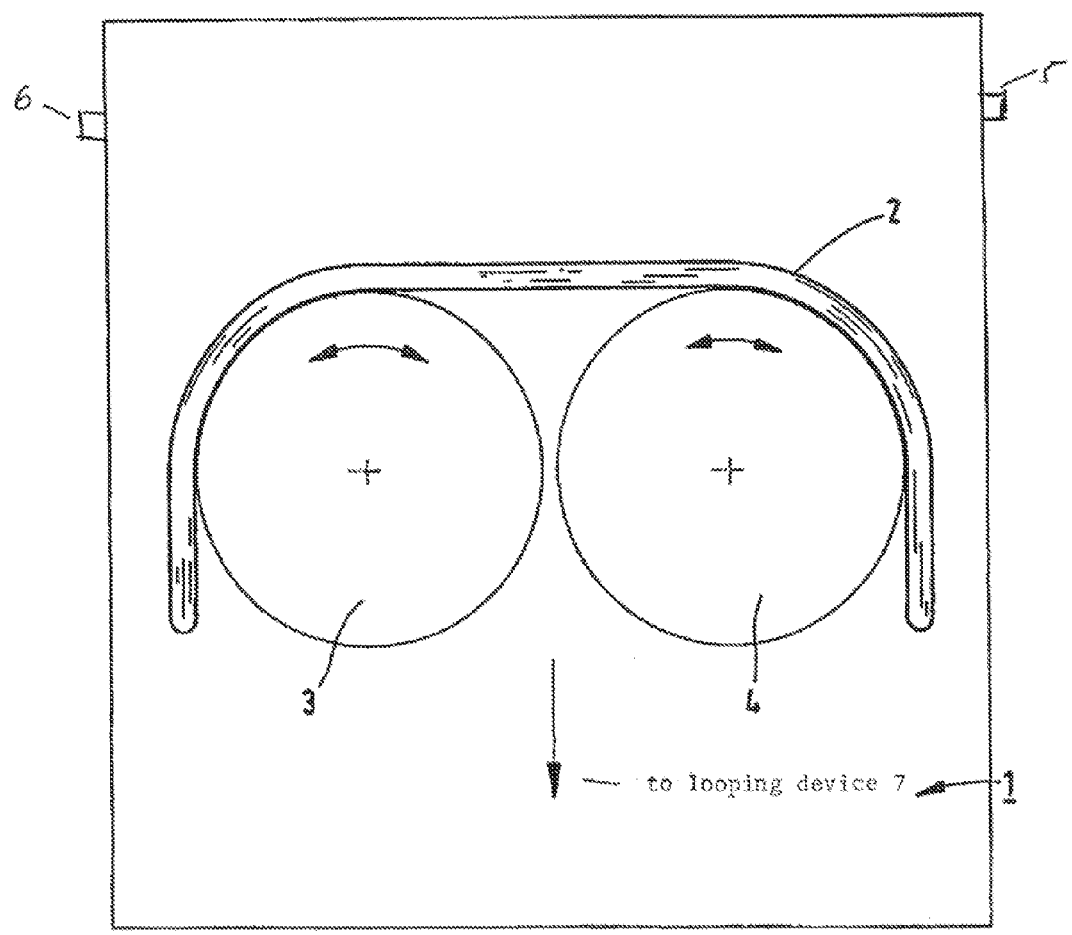
FIG. 2 is a schematic illustration of apparatus for stretching and/or smoothing and/or aligning a raw dough strand for making pretzels.

FIG. 2 is a diagram of a device for stretching and/or aligning raw dough products showing the two thermal imaging sensors 5, 6 used to generate the parameters that control this device for stretching and/or aligning. The conveyor belt 1 transports the raw dough products to the looping device 7 (FIG. 1) for making pretzels.

There has thus been shown and described a novel device for looping raw dough products which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In apparatus for looping pre-shaped strands of raw dough to produce pretzels, said strands having two ends, said apparatus comprising, in combination:
   (a) a device for supplying the raw dough strands and a loop-forming device for looping the raw dough strands, in order to produce pretzel-shaped raw dough products; and
   (b) at least one first thermal imaging sensor configured for (1) detecting a position of at least one end of each raw dough strand for the purpose of controlling the loop-forming device to grip said at least one end, and (2) detecting a dough temperature;
   wherein said end position of each raw dough strand is detected by said at least one first thermal imaging sensor; and
   wherein the dough temperature of the raw dough strands is also detected by said at least one first thermal imaging sensor,
   whereby said dough temperature is increased or decreased to achieve a predetermined temperature, depending upon said detected temperature, so said at least one first thermal imaging sensor serves to monitor a strength of said strands of dough as is required for handling of the raw dough strands.

2. The apparatus for looping raw dough strands according to claim 1, further comprising a device for stretching or aligning the raw dough strands supplied to the loop-forming device in a U-shape having branches to be located in front, and second thermal imaging sensors for detecting the ends of the raw dough strands for stretching or aligning the raw dough strands.

3. The apparatus for looping raw dough strands according to claim 2, wherein said dough temperature of the raw dough strands is detected by at least one of said second thermal imaging sensors, whereby said temperature is increased or decreased to achieve a predetermined temperature, depending upon said detected temperature, by said second thermal imaging sensors.

* * * * *